US010028290B2

(12) United States Patent
Jo et al.

(10) Patent No.: US 10,028,290 B2
(45) Date of Patent: Jul. 17, 2018

(54) APPARATUS AND METHOD FOR SELECTING ADAPTIVE BEAM IN WIRELESS COMMUNICATION SYSTEM

(71) Applicant: Samsung Electronics Co., Ltd., Suwon-si, Gyeonggi-do (KR)

(72) Inventors: Ohyun Jo, Seoul (KR); Chang-Yeul Kwon, Seongnam-si (KR); Dong-Hwi Roh, Seoul (KR); Ji-Sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/102,440

(22) PCT Filed: Dec. 9, 2014

(86) PCT No.: PCT/KR2014/012069
§ 371 (c)(1),
(2) Date: Jun. 7, 2016

(87) PCT Pub. No.: WO2015/088223
PCT Pub. Date: Jun. 18, 2015

(65) Prior Publication Data
US 2016/0323898 A1 Nov. 3, 2016

(30) Foreign Application Priority Data
Dec. 10, 2013 (KR) .................. 10-2013-0153430

(51) Int. Cl.
*H04W 72/08* (2009.01)
*H04B 7/06* (2006.01)
(Continued)

(52) U.S. Cl.
CPC ........ *H04W 72/085* (2013.01); *H04B 7/0617* (2013.01); *H04B 7/0695* (2013.01);
(Continued)

(58) Field of Classification Search
CPC . H04W 72/085; H04W 72/10; H04W 72/048; H04B 7/0617; H04B 7/088; H04B 7/0695; H04L 5/0023
See application file for complete search history.

(56) References Cited

U.S. PATENT DOCUMENTS 6,108,323 A * 8/2000 Gray .................. H04W 72/046
370/335
7,826,854 B2 11/2010 Hovers et al.
(Continued)

FOREIGN PATENT DOCUMENTS

KR 10-2012-0009908 A 2/2012
KR 10-2012-0051210 A 5/2012
(Continued)

OTHER PUBLICATIONS

IEEE Standards for Information Technology, "Part 11: Wireless LAN Medium Access Control (MAC) and Physical Layer (PHY) Specifications, Amendment 3: Enhancements for Very High Throughput in the 60 GHz Band",Dec. 28, 2012, 1-628, IEEE, 3 Park Avenue, New York, NY 10016-5997, USA.

*Primary Examiner* — Mohammad S Anwar
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Embodiments of the present invention provide an apparatus and method for adaptively selecting a beam based on a service and an environment in a wireless communication system supporting beamforming. According to an embodiment of the present invention, a method for operating a device capable of communicating with another device in a wireless communication system includes determining a type of service, determining an optimal beam based on the determined type of service, and beamforming by using the optimal beam. Various other embodiments of the present invention are also available.

20 Claims, 17 Drawing Sheets

(51) Int. Cl.
*H04L 5/00* (2006.01)
*H04W 72/04* (2009.01)
*H04W 72/10* (2009.01)
*H04B 7/08* (2006.01)

(52) U.S. Cl.
CPC ........... *H04B 7/088* (2013.01); *H04L 5/0023* (2013.01); *H04W 72/048* (2013.01); *H04W 72/10* (2013.01)

(56) References Cited

U.S. PATENT DOCUMENTS

| | | | |
|---|---|---|---|
| 2004/0266471 A1* | 12/2004 | Boariu | H04W 52/343 455/522 |
| 2006/0009232 A1* | 1/2006 | Vakil | H04W 16/04 455/453 |
| 2007/0018121 A1* | 1/2007 | Leyman | A61N 5/10 250/494.1 |
| 2008/0170554 A1 | 7/2008 | Wang et al. | |
| 2010/0190450 A1 | 7/2010 | Stirling-Gallacher et al. | |
| 2010/0265924 A1 | 10/2010 | Yong et al. | |
| 2012/0021692 A1 | 1/2012 | Lee | |
| 2012/0106474 A1 | 5/2012 | Wu et al. | |
| 2012/0287797 A1 | 11/2012 | Basson et al. | |
| 2013/0229307 A1 | 9/2013 | Chang et al. | |

FOREIGN PATENT DOCUMENTS

| | | |
|---|---|---|
| KR | 10-2013-0100733 A | 9/2013 |
| WO | 2013/125993 A1 | 8/2013 |

\* cited by examiner

| BEAM | BEAM COST | BEAM PRIORITY |
|---|---|---|
| BEAM#1 | C1 | P1 |
| BEAM#2 | C2 | P2 |
| BEAM#3 | C3 | P3 |
| BEAM#4 | C4 | P4 |
| BEAM#5 | C5 | P5 |

FIG.13

APPARATUS AND METHOD FOR SELECTING ADAPTIVE BEAM IN WIRELESS COMMUNICATION SYSTEM

CROSS-REFERENCE TO RELATED APPLICATIONS

This application is a U.S. National Stage application under 35 U.S.C. § 371 of an International application filed on Dec. 9, 2014 and assigned application number PCT/KR2014/012069, which claimed the benefit of a Korean patent application filed on Dec. 10, 2013 in the Korean Intellectual Property Office and assigned Serial number 10-2013-0153430, the entire disclosure of which is hereby incorporated by reference.

TECHNICAL FIELD

The present invention relates to a wireless communication system that supports beamforming.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A wireless communication system has been developed to support a higher data transmission rate in order to meet wireless data traffic demands, which have continuously increased. For example, the development has been made to improve spectral efficiency based on communication technologies, such as Orthogonal Frequency Division Multiple Access (OFDMA), Multiple Input Multiple Output (MIMO), and the like. As another example, attention to a wireless communication system that uses a super-high frequency band has increased. Particularly, a super-high frequency band wireless mobile communication system that uses a beamforming technology for easing a high transmission path loss in the super-high frequency band, is considered.

A wireless communication system that uses 60 GHz, such as 'Wireless Gigabit (WiGig)' or 'Wireless High Definition (WiHD)', uses a beamforming technology to improve the performance of a wireless link and to enhance the quality of service.

DETAILED DESCRIPTION OF THE INVENTION

Technical Problem

Therefore, the present invention has been made in view of the above-mentioned problems, and an aspect of the present invention is to provide a method and apparatus for adaptively selecting a beam based on a service and an environment in a wireless communication system that supports beamforming.

Another aspect of the present invention is to provide a method and apparatus for selecting a beam to minimize the phenomenon in which a service between a transmitting node and a receiving node is disconnected in a wireless communication system that supports beamforming.

Another aspect of the present invention is to provide a method and apparatus for preventing the disconnection of a service when an obstacle appears between a transmitting node and a receiving node, such as when a person passes between the transmitting node and the receiving node, in a wireless communication system that supports beamforming.

Technical Solution

In accordance with an aspect of the present invention, there is provided a method for operating a transmitting node of a wireless communication system, the method including: determining a type of service; and selecting an optimal beam based on the determined type of service.

In accordance with another aspect of the present invention, there is provided a method for operating a receiving node of a wireless communication system, the method including: determining a type of service; and selecting an optimal beam based on the determined type of service.

In accordance with another aspect of the present invention, there is provided a transmitting node apparatus of a wireless communication system, including: a controller that determines a type of service and selects an optimal beam based on the determined type of service; and a transceiver that transmits data using the selected optimal beam.

In accordance with another aspect of the present invention, there is provided a receiving node apparatus of a wireless communication system, including: a controller that selects an optimal beam based on a type of service provided; and a transceiver that receives data using the selected optimal beam.

In accordance with another aspect of the present invention, there is provide a method for operating a device capable of communicating with another device in a wireless communication system, including: determining a type of service, determining an optimal beam based on the determined type of service, and beamforming by using the optimal beam.

In accordance with another aspect of the present invention, there is provide an apparatus for a device capable of communicating with another device in a wireless communication system, including: a controller configured to determine a type of service, and determine an optimal beam based on the determined type of service, and a transceiver configured to beamform by using the optimal beam.

Advantageous Effects

According to embodiments of the present invention, a beam that has a poor link performance or a beam that is disconnected by an obstacle or a person, even though it has a good link performance, may have a high beam cost, and thus, may not be selected in a beam training process. Instead, an optimal path having a low beam cost may be selected. According to various embodiments of the present invention, when a real-time service is provided, such as streaming, an optimal path in which the streaming is not disconnected may be provided, as opposed to a path in which an obstacle appears or a moving path through which many people pass.

BRIEF DESCRIPTION OF THE DRAWINGS

For complete understanding of the present invention and the effects thereof, descriptions will now be made with reference to the accompanying drawings, wherein like reference numerals refer to the like elements throughout.

FIG. 13 is a diagram illustrating a list of beam priorities for beam selection according to embodiments of the present invention.

MODE FOR CARRYING OUT THE INVENTION

Figure 1:
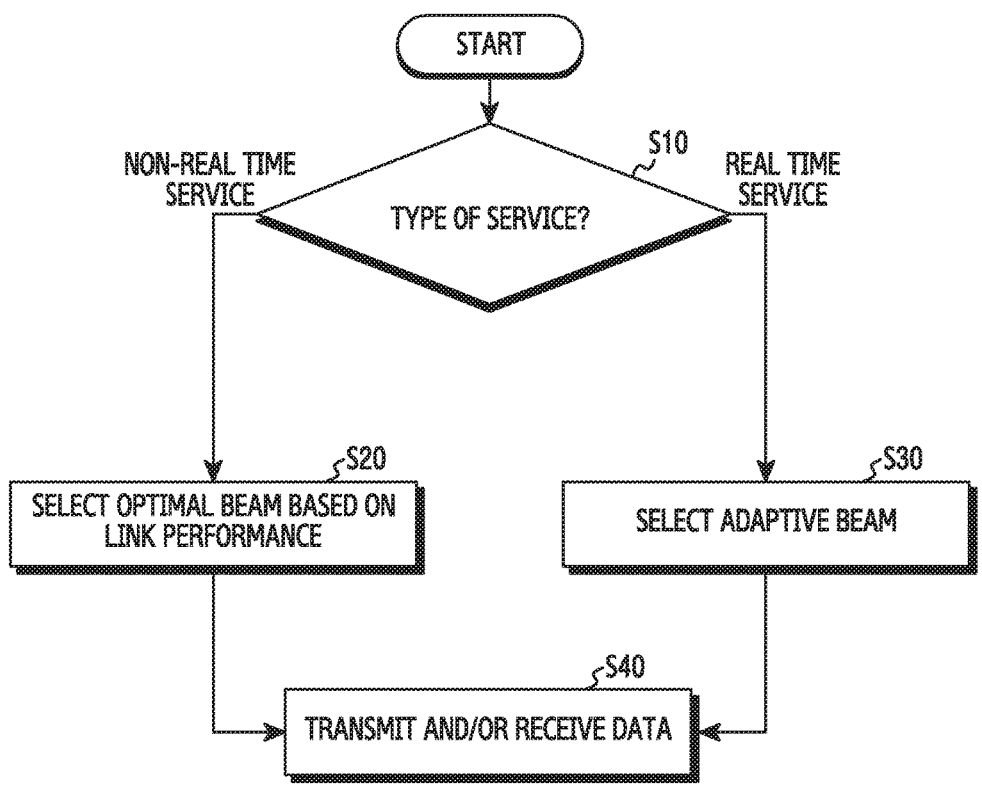
FIG. 1 is a flowchart illustrating a schematic processing flow of beam selection according to various embodiments of the present invention.

In the present patent specification, FIGS. 1 to 14, which are used for describing the principles of the present invention, are merely for the illustrative purpose and should not be construed as anything that limits the scope of the invention. It is apparent to those skilled in the art that the present invention may also be implemented in a wireless communication system in which the principles of the present invention are appropriately disposed.

Embodiments of the present invention to be described below are related to the improvement of a link performance between a transmitting node and a receiving node in a wireless network that supports beamforming. For example, the embodiments of the present invention may be applied to a wireless communication system that uses 60 GHz, such as wireless gigabit (WiGig) or wireless high definition (WiHD). Although the various embodiments of the present invention may be applied to the Institute of Electrical and Electronical Engineers (IEEE) 802.11ad system, which is based on WiGig, representatively, the embodiments may also applied equally to all wireless communication systems that perform beamforming using multiple antennas.

In the WiGig-based IEEE 802.11ad system, all the physical energy of a wireless signal is transmitted to a predetermined user or in a predetermined direction through beamforming, and thus, the efficiency of an antenna may be increased. When all the energy is transmitted in the direction of the user, the magnitude of a reception signal of a predetermined user becomes large whereas interference affected to users in other directions becomes low. This may increase the data rate by increasing the Signal to Noise Ratio (SNR) of the user, and also, may enable different users to simultaneously use a resource from the perspective of reusing space.

The IEEE 802.11 ad system may use analog-type beamforming. A transmitter and a receiver may have array antenna structures, each formed of various antenna elements. In this instance, by determining the phases of the antenna elements to be different from each other, the energy of a radio signal is physically pushed in a predetermined direction. As the number of antenna elements increases, the minuteness in adjusting the shape of a beam during beamforming may also increase.

A beamforming protocol that operates based on the IEEE 802.11ad system may be defined by a sector level sweep or a Beam Refinement Protocol (BRP). The protocols select a beam having the best performance from among multiple beams. Antenna weight vectors that determine the direction of a beam are determined in advance. Therefore, beamforming in the IEEE 802.11ad system may be a method that is based on searching, as opposed to a method that considers a channel by receiving impulse response information of a channel as feedback. When beamforming is performed by performing a sector level sweep or beam refinement protocol, the optimal beam may be selected after transmitting beams in all available directions.

An ScS packet defined in the standard may be used for performing the sector level sweep. The scheme shoots a beacon frame or an ScS frame for each direction, and selects an optimal beam using an SNR or Received Signal Strength Indicator (RSSI) information associated with a packet of which reception is successful. The sector level sweep is mainly used to set up a link at the initial stage when a link between a transmitting node and a receiving node is not established. When any one of the packets transmitted through beams in different directions is successfully received, a connection may be set up using a link in the corresponding direction.

The BRP is a protocol used to send data through an optimal beam. A BRP frame may be used for performing the BRP. The BRP is identical to the sector level sweep from the perspective of training multiple directions. However, it is different from the sector level sweep in that only a single BRP frame is used when training multiple directions. The sector level sweep transmits as many beacon frames or ScS frames as the number of directions to be trained. Therefore, a beamforming protocol may be performed more quickly than the other. However, the scheme may perform beamforming only after receiving a BRP frame. Therefore, from the perspective of the robustness of a protocol, the sector level sweep is better than the BRP. The BRP is frequently used to search for an optimal beam direction for data transmission when a link is already established, or is used to restore a link performance when the environment of a link is changed and the performance of the radio link deteriorates. The sector level sweep or the BRP may be performed iteratively.

As described above, the IEEE 802.11ad system performs training based on the sector level sweep or the BRP, so as to select a beam having the best SNR or RSSI, and provides a service through the selected beam. In this instance, when an obstacle is provided or a person passes between the transmitting node or a receiving node, or the like, the service may be disconnected. This may frequently occur when a user is provided with a real time service, when compared to the case of a non-real time service. That is, when a service is disconnected while a user is provided with a real-time service, the user may experience a significantly lower quality of service. For example, in a scenario in which a television (TV) receives image data transmitted from radio equipment and reproduces an image, when a moving path of people exists between a transmitting node and a receiving node, the reproduction of the image may be disconnected every time people pass the moving path. Although there is another communication path that is capable of performing transmission by avoiding the moving path of people, the deterioration of quality of service may be unavoidable. In the case of a real time service, when a data radar that is capable of maintaining a service is obtainable, empirically selecting a beam of which quality of service does not deteriorate by externality may be better, from the perspective of a user, than selecting a beam having the highest SNR or RSSI.

Therefore, in the case where a wireless communication system, such as IEEE 802.11ad detects an optimal path through beamforming for data transmission, and transmits data by pushing all of the energy in a predetermined direction, when an obstacle appears in a link or the directions of a transmitting node and a receiving node are changed by movement, embodiments of the present invention to be described below may perform beam training based on a beamforming protocol and may newly obtain an optimal direction. That is, embodiments of the present invention provide a method of selecting the most effective beam depending on a situation when selecting the direction of a physical beam, and through this, maximizing the quality of service (QoS) based on a type of service.

FIG. 1 is a flowchart illustrating a schematic processing flow of beam selection according to various embodiments of the present invention. The processing flow is to minimize the disconnection of a service when a real time service is provided in a wireless communication system, and to improve the quality of service that a user may experience. To this end, a wireless transmitting/receiving device differentiates a method of selecting a beam based on a type of service when performing beamforming.

A transmitting node and a receiving node of a wireless communication system determines a type of service in operation S10, and determines a beam selection method based on the type of service in operations S20 and S30. In the case of a non-real time service, an optimal beam is selected based on a link performance in operation S20. In the case of a real time service, a beam is adaptively selected in operation S30. Data is transmitted and received through the selected beam in operation S40.

Figure 2:
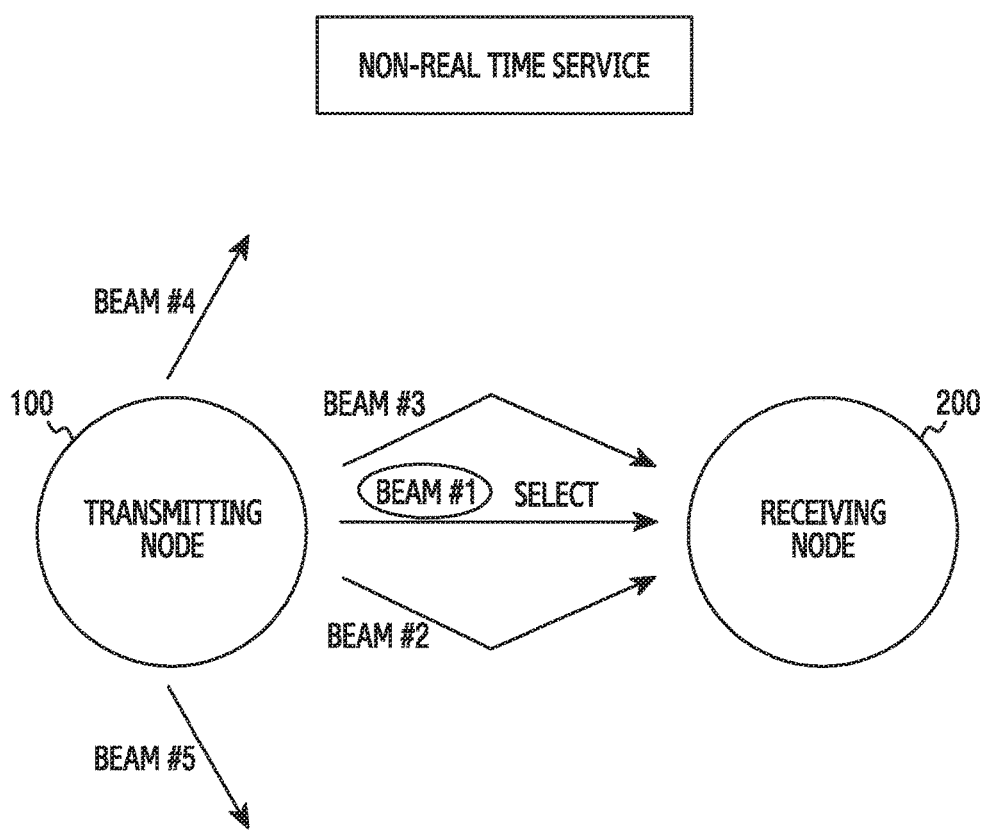
FIG. 2 is a diagram illustrating an example of beam selection, according to embodiments of the present invention, when a non-real time service is provided in a wireless communication system.

FIG. 2 is a diagram illustrating an example of beam selection, according to embodiments of the present invention, when a non-real time service is provided in a wireless communication system.

Referring to FIG. 2, a beam #1 having the best link quality (or performance) may be selected from among multiple (e.g., 5) beams that exist between a transmitting node 100 and a receiving node 200. The link quality may be evaluated based on SNR or RSSI information. In the case of a non-real time service, sending data most rapidly is the biggest criterion for determining the quality of service that a user may experience, and thus, the present embodiment selects a beam that is most rapidly capable of sending data.

Figure 3A:
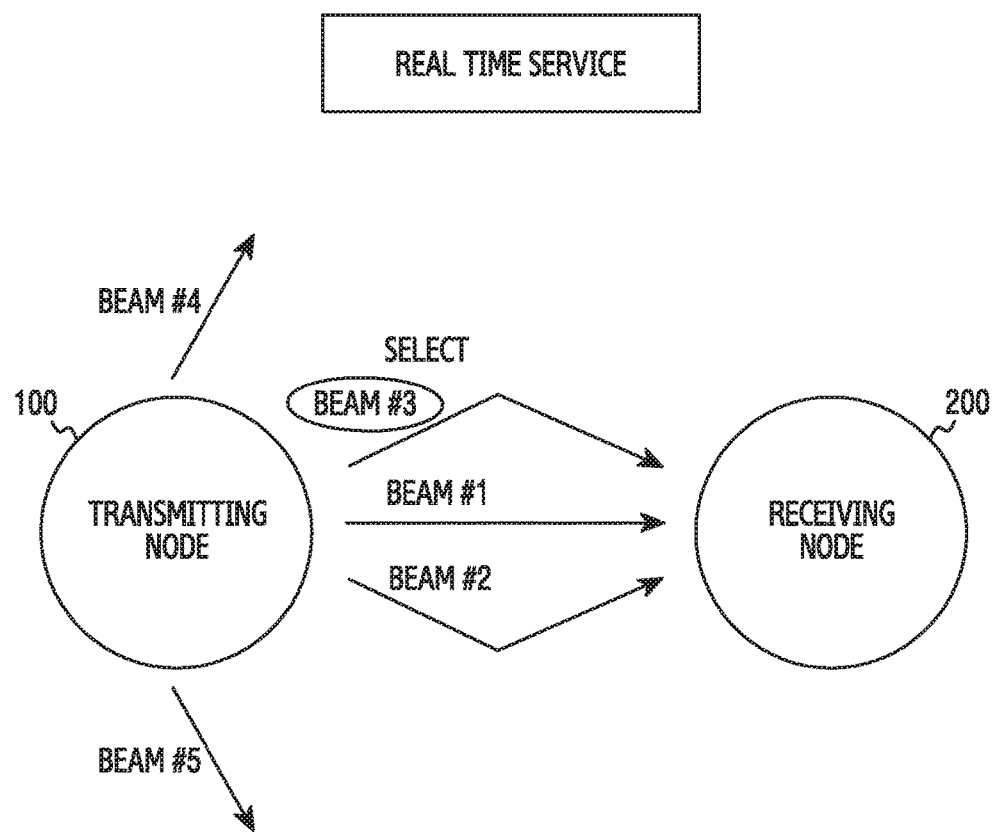
FIGS. 3A and 3B are diagrams illustrating an example of beam selection, according to embodiments of the present invention, when a real time service is provided in a wireless communication system.
Figure 3B:
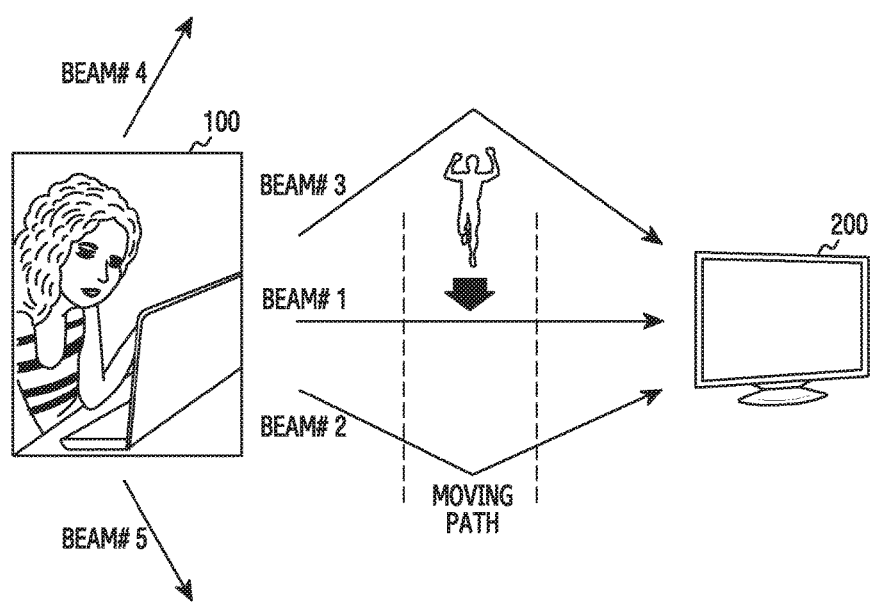

FIGS. 3A and 3B are diagrams illustrating an example of beam selection, according to embodiments of the present invention, when a real time service is provided in a wireless communication system.

Referring to FIG. 3A, a beam #3, in which the disconnection of a service least frequently occurs, may be selected from among multiple (e.g., 5) beams that exist between the transmitting node 100 and the receiving node 200. In the case of a real-time service, such as a streaming service or game, the seamless service is the biggest criterion for determining the quality of service that a user may experience, and thus, the present embodiment selects a beam in which the disconnection of a service least frequently occurs. To this end, an embodiment of the present invention proposes an algorithm that learns information in the past, and adaptively selects a beam based on the experience.

Referring to FIG. 3B, in the case of a scenario in which the TV 200 receives image data transmitted from the radio equipment (e.g., a tablet PC) 100 and reproduces an image, when a moving path of people exists between the transmitting node 100 and the receiving node 200, the reproduction of the image may be disconnected every time people pass. In the case of a real time service, when a data radar that is capable of maintaining a service is obtainable, empirically selecting a beam #3, of which quality of service does not deteriorate by externality, may be better, from the perspective of a user, than selecting a beam #1 that has the highest SNR or RSSI. When a beam is selected based on a link performance, ping-ponging may occur in beam selection, such as beam #1 beam #2 beam #1.

According to an adaptive beam selection algorithm according to an embodiment of the present invention, a beam cost, a beam priority, service criteria, and a beam window are defined.

The beam cost is defined with respect to all of the available beams. The beam cost is a statistical numeral value associated with a degree of deterioration of a service when a corresponding beam is selected. That is, the beam cost indicates an index indicating how frequently a beam changes when the corresponding beam is selected. As the cost increases, the frequency of the disconnection of a service that is provided through a corresponding beam increases. Conversely, as the cost decreases, the frequency of the disconnection of a service that is provided through a corresponding beam decreases. According to an embodiment of the present invention, the beam cost may correspond to the number of times that a packet error rate (PER) is dropped to be lower than, or equal to, a predetermined level while data transmission and reception is performed through a corresponding beam. According to another embodiment of the present invention, the beam cost may correspond to the number of times that beamforming is performed or the number of times that beamforming is triggered, while data transmission and reception is performed through a corresponding beam. Generally, beamforming triggering is performed to detect a new beam since the quality of a channel is dropped to be lower than, or equal to, a predetermined level. As another example, the beam cost may be the number of times that queue is empty. In addition to the above described examples, the concept of the beam cost may be defined in various ways.

The beam priority is defined based on a beam cost. The beam priority is an index indicating a beam to be selected when beamforming is triggered. This is the opposite concept from that of the beam cost, and may be calculated based on the beam cost. That is, the beam priority is determined to enable a beam having a lower beam cost to have a higher probability of being selected when a beam is changed. For example, when a total of 4 beams exist, and the beam costs of them are 1, 2, 2, and 5, respectively, a probability that beamforming would select a first beam is $1/(1+1/2+1/2+1/5)$. A probability that beamforming would select a second beam is $(1/2)/(1+1/2+1/2+1/5)$. A probability that beamforming would select a third beam is $(1/2)/(1+1/2+1/2+1/5)$. A probability that beamforming would select a fourth beam is $(1/5)/(1+1/2+1/2+1/5)$. In addition to the above described examples, the concept of the beam priority may be defined in various ways.

The service criteria may be defined as criteria for determining whether a service is available when a beam is changed. According to an embodiment of the present invention, the service criteria may be determined based on a PER. According to another embodiment of the present invention, the service criteria may be determined based on an SNR. When a real time service is provided, a requirement of a minimum data rate required for each service may exist. In the situation in which the minimum data rate is satisfied, values, such as a delay or jitter, may be an index of the quality of service (QoS) that a user may experience. For example, a criterion, such as how frequently a PER increases to be greater than or equal to 10% during a predetermined period of time, may be a criterion for a user to determine whether the quality of service is good or poor, and a beam cost may be determined based on the criterion.

The beam window is an index indicating the amount of time to be expended for performing monitoring so as to update the beam cost value. According to an embodiment of the present invention, the beam window may be defined as an absolute value, such as 1 minute, 10 seconds, or the like. According to another embodiment of the present invention, the beam window may be defined as a relative value, such as a section in which beamforming is triggered 10 times. According to another embodiment of the present invention, the beam window may be defined as a value corresponding to the number of packets. A wireless transmitting and receiving device may manage a beam cost by reflecting only an event that occurs during this section.

Figure 4:
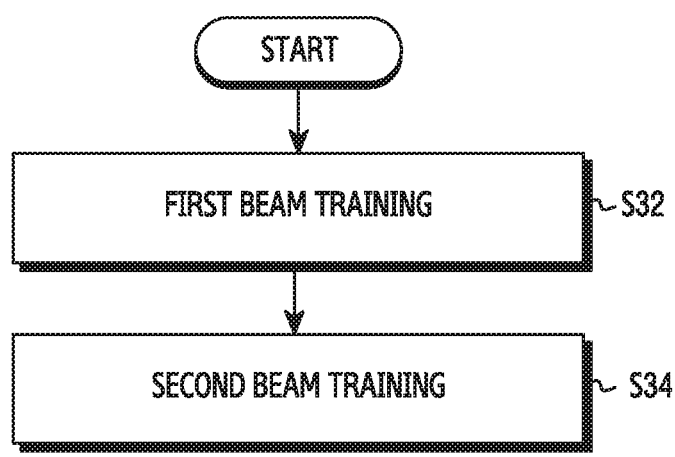
FIG. 4 is a diagram illustrating a beam training operation for beam selection, which is performed through two stages, according to embodiments of the present invention.

FIG. 4 is a diagram illustrating a beam training operation for beam selection, which is performed through two stages, according to embodiments of the present invention.

Referring to FIG. 4, a first beam training operation is performed in operation S32, and a second beam training operation is performed in operation S34. The first beam training S32 is a process that is generally performed to detect an optimal beam when beamforming is performed, which complies with a general beamforming protocol defined in the spec. For example, the IEEE 802.11ad system complies with a sector level sweep or a beam refinement protocol. After the first beam training selects a beam having the best link quality between the transmitting node 100 and the receiving node 200, based on SNR or RSSI information, data transmission begins.

The second beam training S34 is a training process that is performed to learn a beam that is adaptive to an environment, and which is least frequently disconnected, according to embodiments of the present invention. The second beam training is a relatively simplified training process when compared to the first beam training. It is formed of an operation of detecting a reception (Rx) beam that is appropriate for a transmission (Tx) beam that is changed. The process needs to be quickly and simply performed so as not to affect the quality of service. As described above, when the environment-adaptive beamforming protocol proposed in the present invention begins, a Tx beam may be changed by selecting a beam based on a probability that is based on a beam priority. In this instance, to detect the direction of an optimal Rx beam with respect to the changed Tx beam, the second beam training process that trains only an Rx beam of the receiving node 200 is performed. Although both the first beam training and the second beam training comply with a beamforming protocol defined in the standard, the first beam training is a method of selecting an optimal beam in a given situation by training both a Tx beam and an Rx beam of the transmitting node 100 and the receiving node 200, and the second beam training is a process of detecting an optimal Rx beam with respect to a changed Tx beam, which may be quickly performed through a simple process when compared to the first beam training. Whether a changed beam is appropriate for a service needs to be determined quickly when a Tx beam is changed for beam training, so the second beam training is performed. When the first beam training process, which is general, is performed, a large amount of time may be expended. In this instance, an amount of time that may be used for transmitting data for a service may be reduced and a probability that a service is disconnected may become higher. Therefore, as the amount of time expended for the second beam training process that occurs during beam training becomes shorter, the effect on the quality of service becomes smaller.

Figure 5:
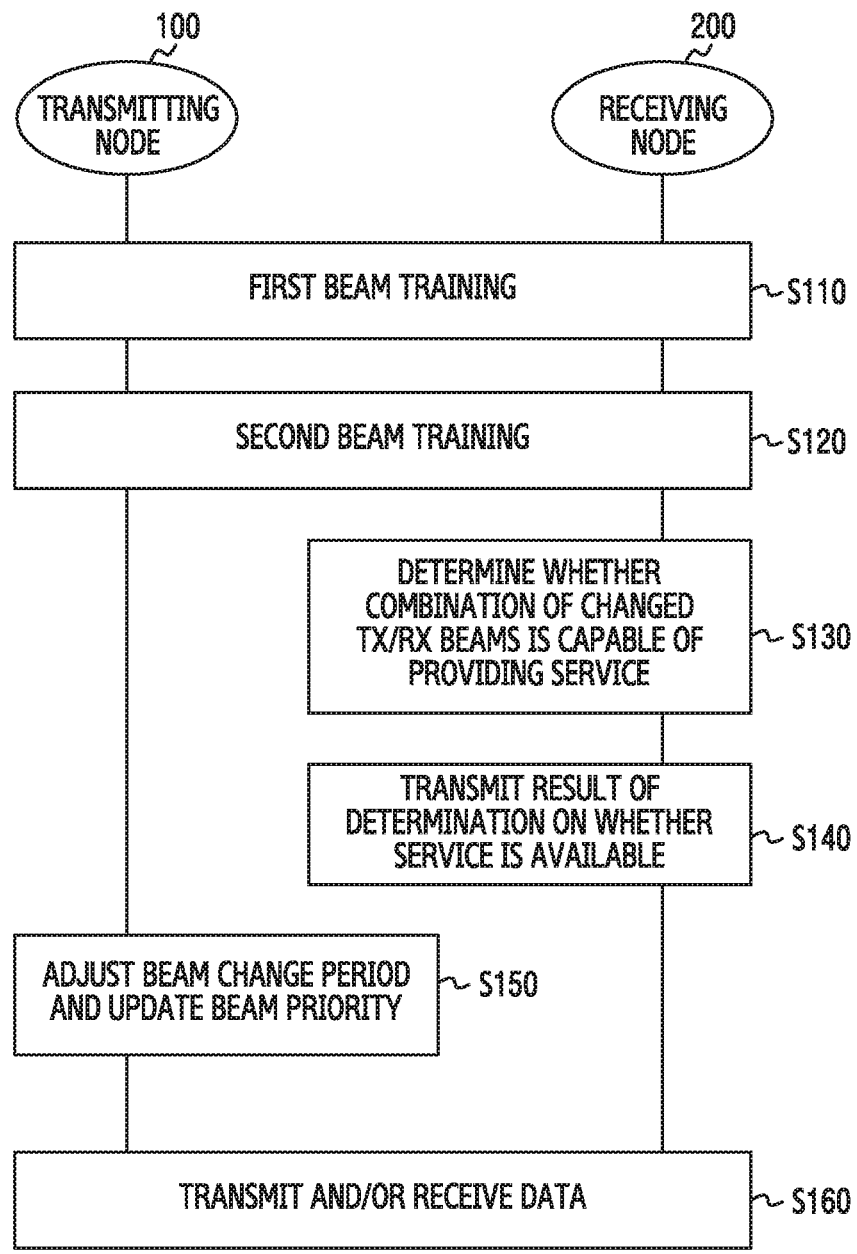
FIG. 5 is a flowchart illustrating a processing flow of beam selection according to an embodiment of the present invention.

FIG. 5 is a flowchart illustrating a processing flow of beam selection according to an embodiment of the present invention.

Referring to FIG. 5, the transmitting node 100 and the receiving node 200 perform first beam training in operation S110. As a result of the first beam training, an optimal combination of a Tx beam and an Rx beam is selected based on a link performance. In operation S120, the transmitting node 100 and the receiving node 200 perform second beam training. As a result of the second beam training, a Tx beam is changed and an optimal Rx beam is selected with respect to the changed Tx beam.

In operation S130, the receiving node 200 determines whether the combination of changed Tx/Rx beams is capable of providing a service. Determining whether the combination of changed Tx/Rx beams is capable of providing a service indicates determining whether the combination of newly selected Tx/Rx beams is appropriate for supporting the present service. That is, whether the combination of the newly selected Tx/Rx beams satisfies predetermined service criteria and enables the present service may be determined. According to an embodiment of the present invention, the service criteria may be determined based on a PER or an SNR. The service criteria may be defined in various other forms. In operation S140, the receiving node 200 transmits, to the transmitting node 100, a result of determining whether a service is available.

In operation S150, the transmitting node 100 adjusts a beam change period based on whether the combination of the changed Tx/Rx beams is capable of providing a service and updates a beam priority. When the combination of changed Tx/Rx beams is capable of providing the service, the transmitting node 100 increases the beam change period. Conversely, when the combination of changed Tx/Rx beams is incapable of providing the service, the transmitting node 100 increases the cost associated with the corresponding beam and updates the beam priority.

In operation S160, the transmitting node 100 and the receiving node 200 transmit and/or receive data. The data transmission and reception may be performed when the combination of the changed Tx/Rx beams is capable of providing the service.

Figure 6A:
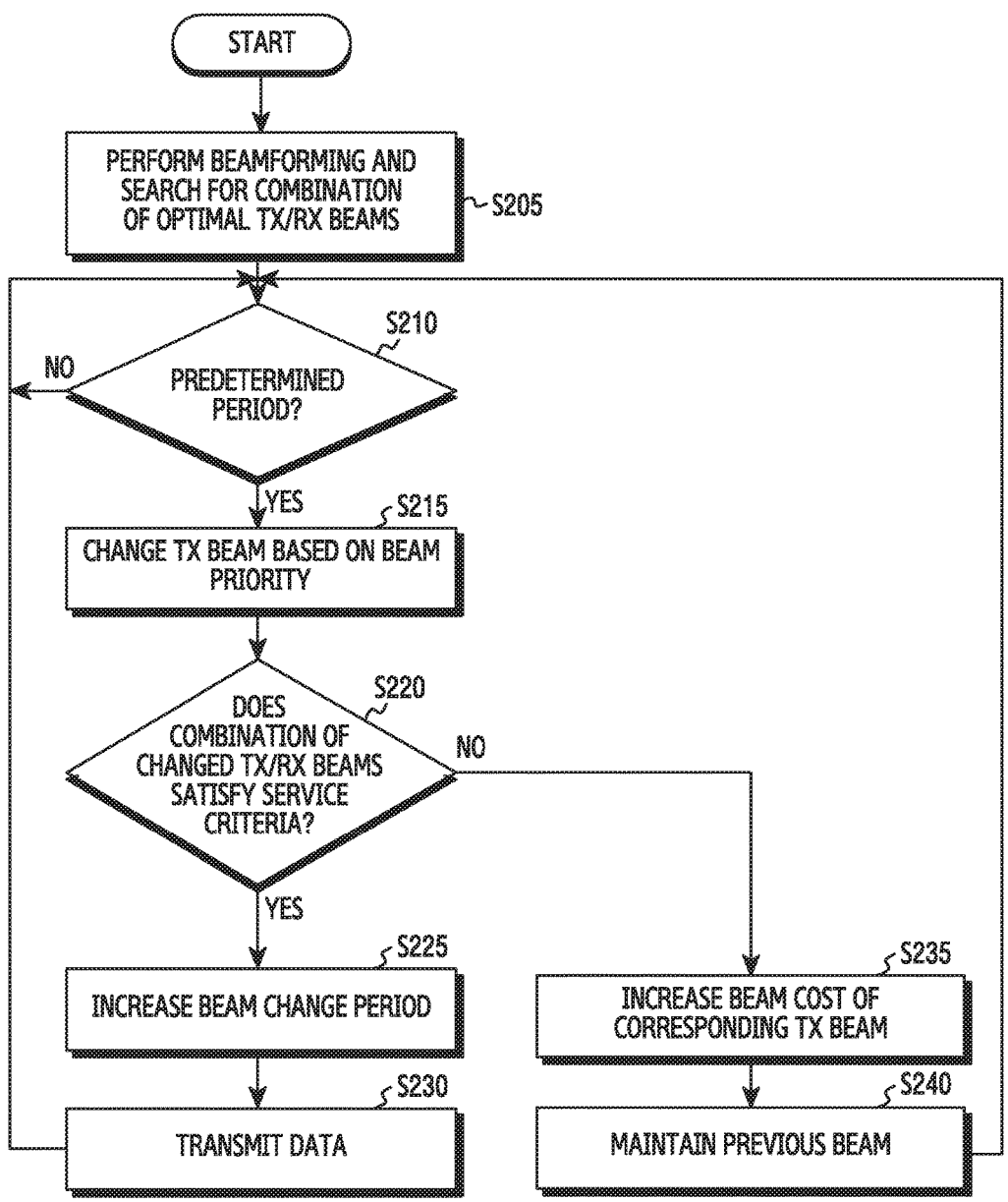
FIGS. 6A to 6C are flowcharts illustrating processing flows of beam selection by a transmitting node according to an embodiment of the present invention.
Figure 6B:
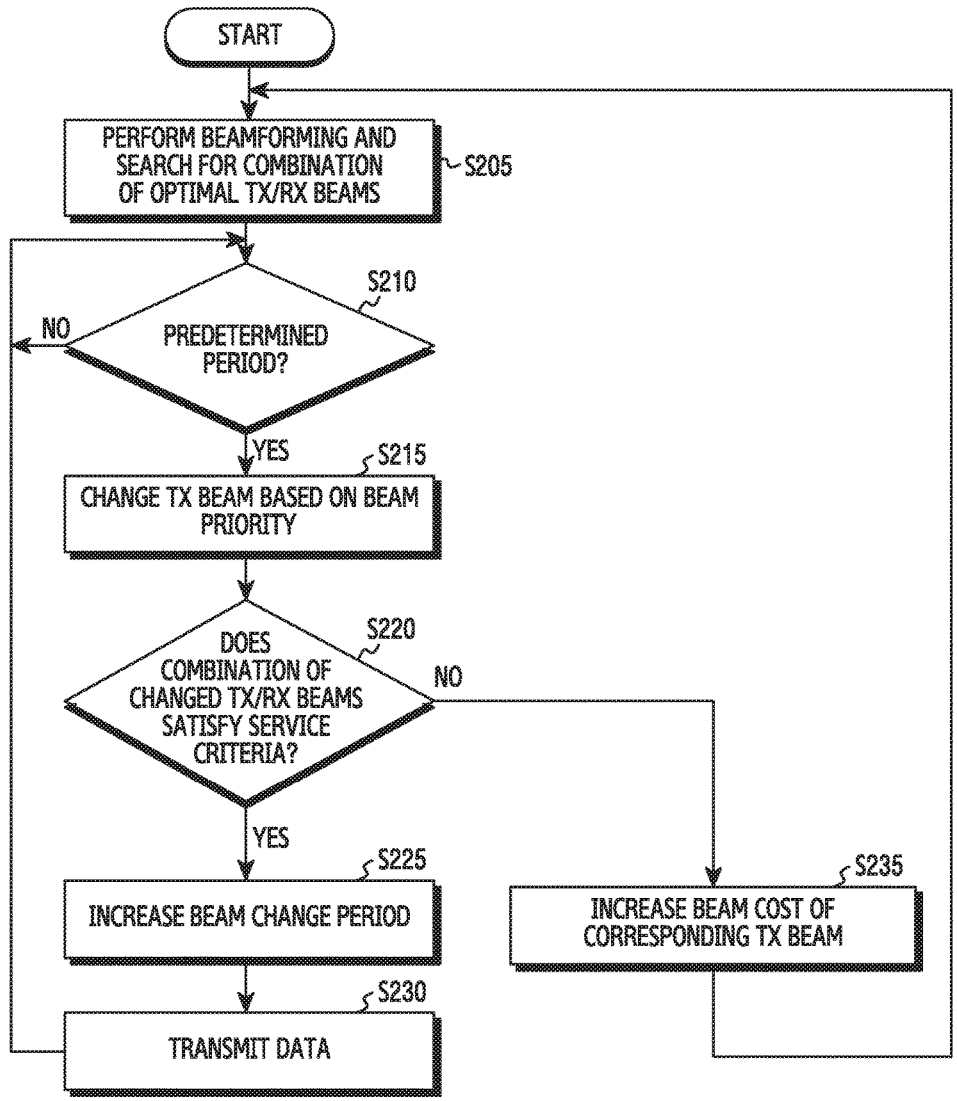
Figure 6C:
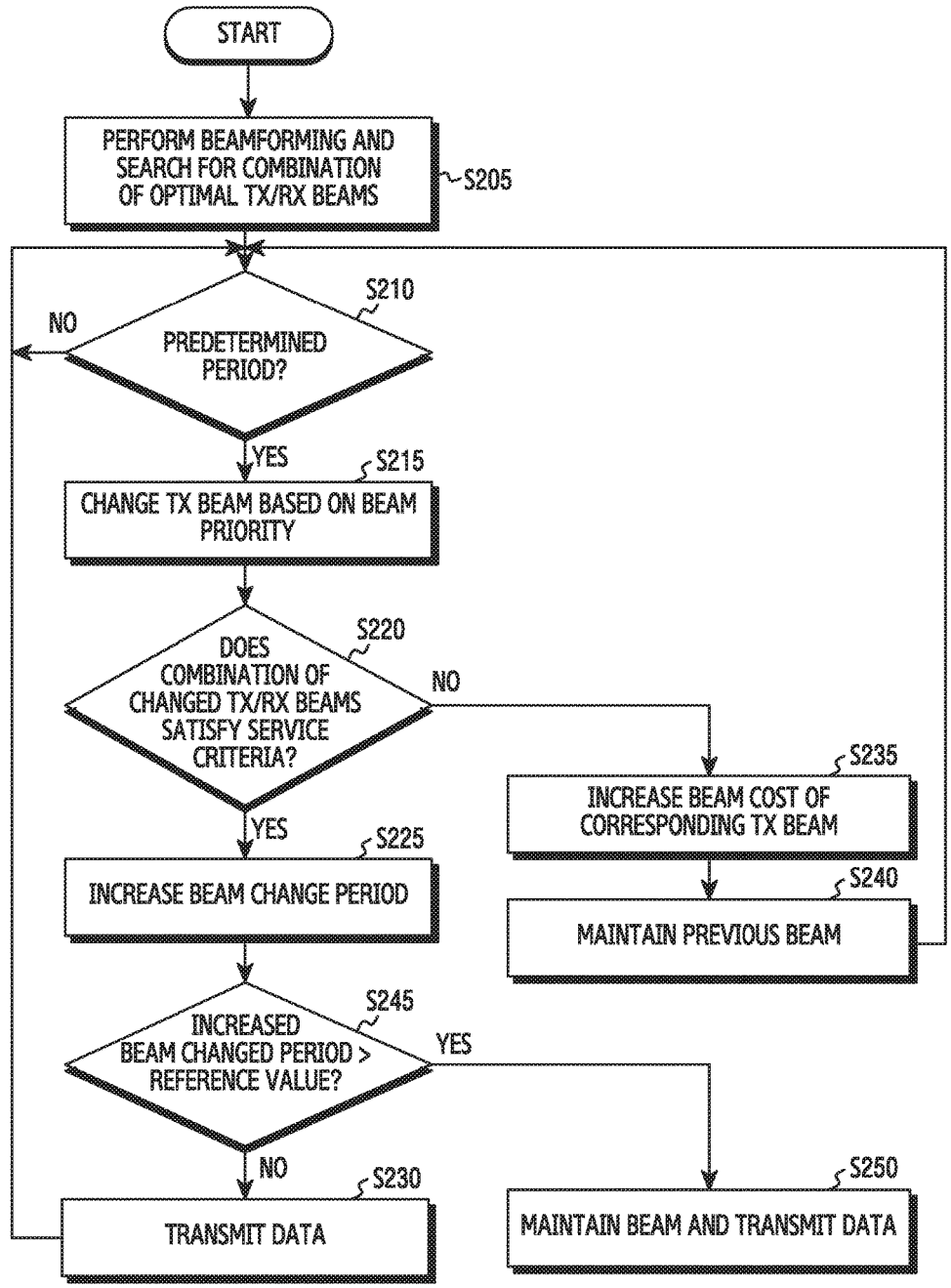

Although FIG. 5 illustrates that beam selection is performed as an one-shot event, the beam selection is performed repeatedly as illustrated in FIGS. 6A through 6C, and selects a beam that is least frequently disconnected, based on statistical information in a given situation.

FIGS. 6A to 6C are flowcharts illustrating processing flows of beam selection performed by the transmitting node 100 according to an embodiment of the present invention. The flows illustrated in FIGS. 6A to 6C are merely examples for describing the invention, and various modified flows are available, and thus, it should not be construed that the examples limit the scope of the present invention.

Referring to FIG. 6A, in operation S205, the transmitting node 100 performs beamforming and searches for a combination of optimal Tx/Rx beams. Operation S205 corresponds to a first beam training process.

In operation S210, the transmitting node 100 determines whether a predetermined period arrives. When the predetermined period arrives, the transmitting node 100 changes a Tx beam based on a beam priority in operation S215. In response to the change of the Tx beam, the receiving node 200 searches for an optimal Rx beam with respect to the changed Tx beam. Operations S210 and S215 correspond to a second beam training process.

In operation S220, the transmitting node 100 determines whether the combination of the changed Tx/Rx beams satisfies service criteria. According to an embodiment of the present invention, whether the combination of the changed Tx/Rx beams satisfies the service criteria is determined by the receiving node 200. As the result of the determination is transmitted to the transmitting node 100, the transmitting node 100 may determine whether the combination of the changed Tx/Rx beams satisfies the service criteria.

When the combination of the changed Tx/Rx beams satisfies the service criteria, the transmitting node 100 increases a beam change period in operation S225, and transmits data in operation S230. After transmitting data in operation S230, the transmitting node 100 returns to operation S210.

When the combination of the changed Tx/Rx beams does not satisfy the service criteria, unlike the above description, the transmitting node 100 increases a beam cost associated with the corresponding Tx beam in operation S235, maintains the previous Tx beam that was used before changing in operation S240, and proceeds with operation S210.

Referring to FIG. 6B, in operation S205, the transmitting node 100 performs beamforming, and searches for a combination of optimal Tx/Rx beams. Operation S205 corresponds to the first beam training process.

In operation S210, the transmitting node 100 determines whether a predetermined period arrives. When the predetermined period arrives, the transmitting node 100 changes a Tx beam based on a beam priority in operation S215. In response to the change of the Tx beam, the receiving node 200 searches for an optimal Rx beam with respect to the changed Tx beam. Operations S210 and S215 correspond to the second beam training process.

In operation S220, the transmitting node 100 determines whether the combination of the changed Tx/Rx beams satisfies service criteria. According to an embodiment of the present invention, whether the combination of the changed Tx/Rx beams satisfies the service criteria is determined by the receiving node 200. As the result of the determination is transmitted to the transmitting node 100, the transmitting node 100 may determine whether the combination of the changed Tx/Rx beams satisfies the service criteria.

When the combination of the changed Tx/Rx beams satisfies the service criteria, the transmitting node 100 increases the beam change period in operation S225, and transmits data in operation S230. After transmitting data in operation S230, the transmitting node 100 returns to operation S210.

When the combination of the changed Tx/Rx beams does not satisfy the service criteria, unlike the above description, the transmitting node 100 increases the beam cost associated with the corresponding Tx beam in operation S235, and proceeds with operation S205 to search all of the beams.

Referring to FIG. 6C, in operation S205, the transmitting node 100 performs beamforming, and searches for a combination of optimal Tx/Rx beams. Operation S205 corresponds to the first beam training process.

In operation S210, the transmitting node 100 determines whether a predetermined period arrives. When the predetermined period arrives, the transmitting node 100 changes a Tx beam based on a beam priority in operation S215. In response to the change of the Tx beam, the receiving node 200 searches for an optimal Rx beam with respect to the changed Tx beam. Operations S210 and S215 correspond to the second beam training process.

In operation S220, the transmitting node 100 determines whether the combination of the changed Tx/Rx beams satisfies service criteria. According to an embodiment of the present invention, whether the combination of the changed Tx/Rx beams satisfies the service criteria is determined by the receiving node 200. As the result of the determination is transmitted to the transmitting node 100, the transmitting node 100 may determine whether the combination of the changed Tx/Rx beams satisfies the service criteria.

When the combination of the changed Tx/Rx beams satisfies the service criteria, the transmitting node 100 increases the beam change period in operation S225. In operation S245, the transmitting node 100 determines whether the increased beam change period is greater than a reference value. When the increased beam change period is not greater than the reference value, the transmitting node 100 transmits data in operation S230. Conversely, when the increased beam change period is greater than the reference value, the transmitting node 100 maintatins the beam and transmits data in operation S250. After transmitting data in operations S230 and S250, the transmitting node 100 returns to operation S210.

When the combination of the changed Tx/Rx beams does not satisfy the service criteria, unlike the above description, the transmitting node 100 increases the beam cost associated with the corresponding Tx beam in operation S235, maintains the previous Tx that was used before changing in operation S240, and proceeds with operation S210.

Figure 7:
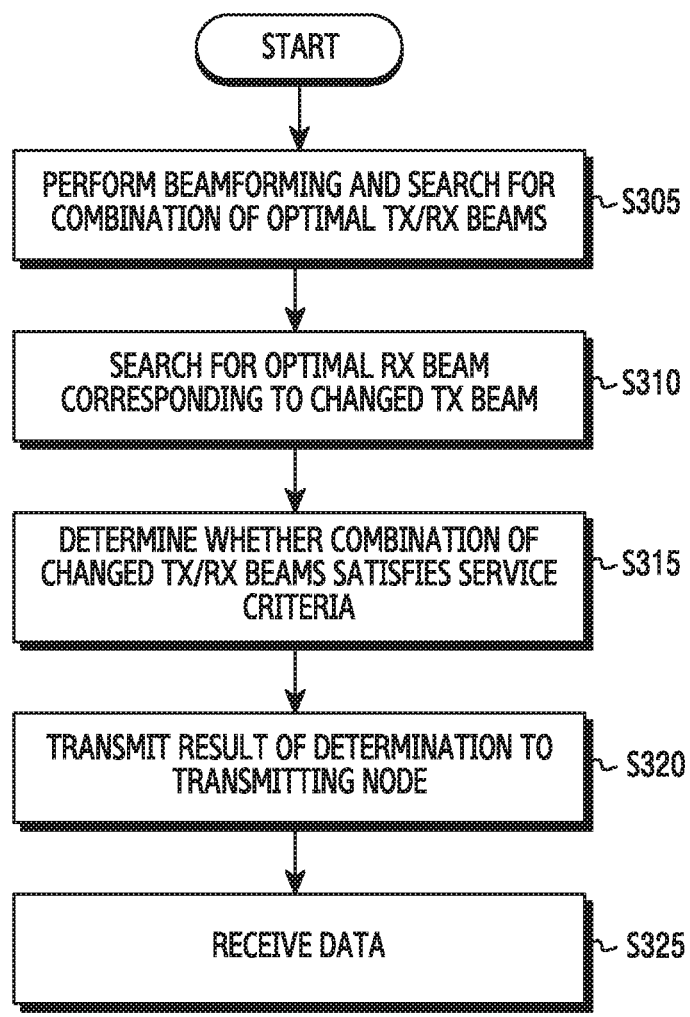
FIG. 7 is a flowchart illustrating a processing flow of beam selection by a receiving node according to an embodiment of the present invention.

FIG. 7 is a flowchart illustrating a processing flow of beam selection by the receiving node 200 according to an embodiment of the present invention. The flow illustrated in FIG. 7 is merely an example for describing the invention, and various modified flows are available, and thus, it should not be construed that the example limits the scope of the present invention.

Referring to FIG. 7, in operation S305, the receiving node 200 performs beamforming and searches for a combination of optimal Tx/Rx beams. Operation S305 corresponds to a first beam training process.

In operation S310, the receiving node 200 searches for an optimal Rx beam with respect to a Tx beam that is changed by the transmitting node 100. According to an embodiment of the present invention, a Tx beam is changed by the transmitting node 100 based on a predetermined period, and the transmitting node 100 changes a Tx beam based on a beam priority. Operation S310 corresponds to a second beam training process.

The receiving node 200 determines whether a combination of changed Tx/Rx beams satisfies service criteria in operation S315. The receiving node 200 transmits, to the transmitting node 100, the result of the determination on whether the combination of the changed Tx/Rx beams satisfies the service criteria in operation S320.

In operation S325, the receiving node 200 receives data. The reception of data is performed when the transmitting node 100 transmits data in response to when it is determined that the combination of the changed Tx/Rx beams satisfies the service criteria and the result of the determination is transmitted to the transmitting node 100.

Figure 8:
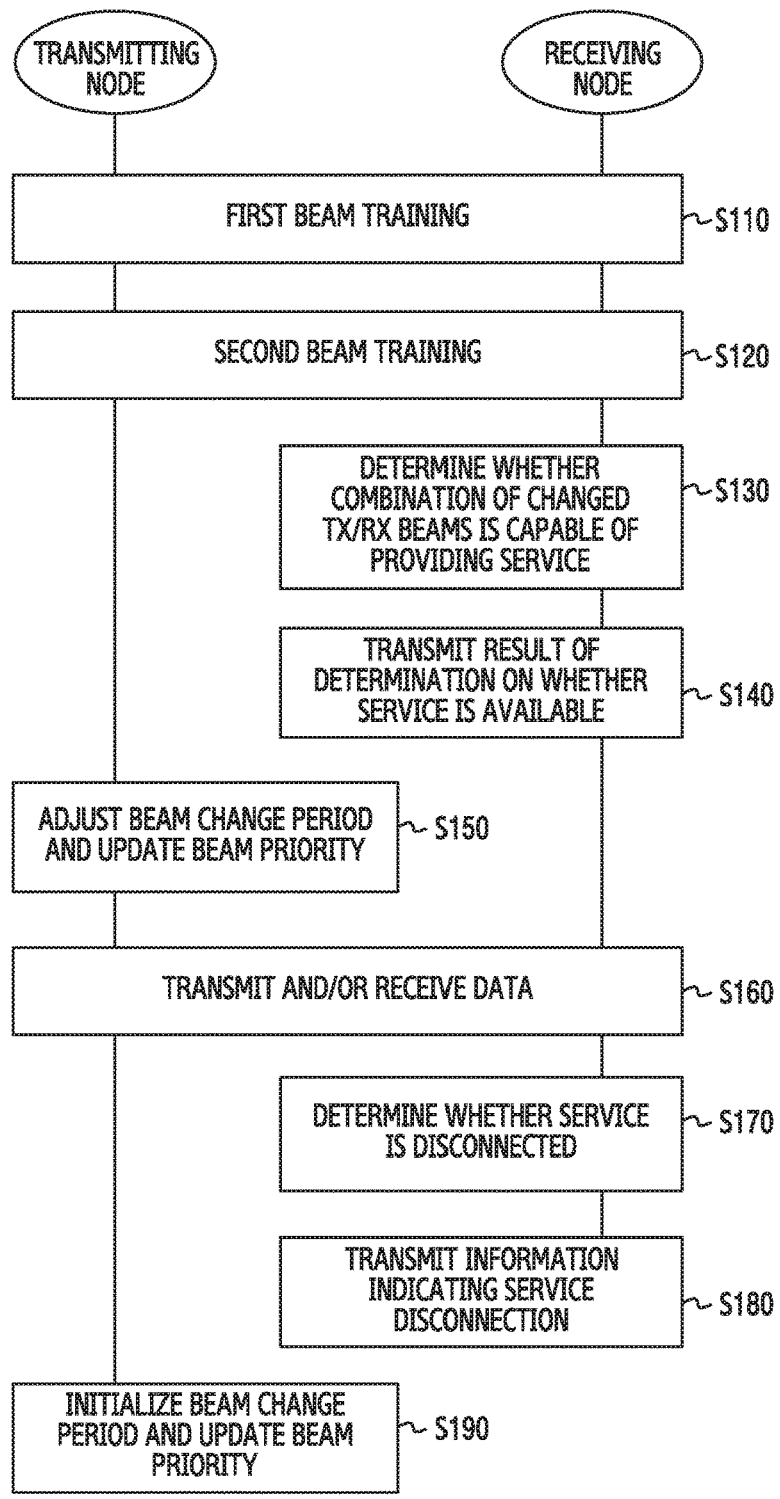
FIG. 8 is a flowchart illustrating a processing flow of beam selection according to another embodiment of the present invention.

FIG. 8 is a flowchart illustrating a processing flow of beam selection according to another embodiment of the present invention.

Referring to FIG. 8, the transmitting node 100 and the receiving node 200 perform first beam training in operation S110. As a result of the first beam training, an optimal combination of a Tx beam and an Rx beam is selected based on a link performance. In operation S120, the transmitting node 100 and the receiving node 200 perform second beam training. As a result of the second beam training, a Tx beam is changed and an optimal Rx beam is selected with respect to the changed Tx beam.

In operation S130, the receiving node 200 determines whether the combination of the changed Tx/Rx beams is capable of providing a service. Determining whether the combination of changed Tx/Rx beams is capable of providing a service indicates determining whether the combination of newly selected Tx/Rx beams is appropriate for supporting the present service. That is, whether the combination of the newly selected Tx/Rx beams satisfies predetermined service criteria and enables the present service may be determined. According to an embodiment of the present invention, the service criteria may be determined based on a PER or an SNR. The service criteria may be defined in various other forms. In operation S140, the receiving node 200 transmits, to the transmitting node 100, the result of determining whether a service is available.

In operation S150, the transmitting node 100 adjusts a beam change period based on whether the combination of the changed Tx/Rx beams is capable of providing a service, and updates a beam priority. When the combination of changed Tx/Rx beams is capable of providing the service, the transmitting node 100 increases the beam change period. Conversely, when the combination of changed Tx/Rx beams is incapable of providing the service, the transmitting node 100 increases the cost associated with the corresponding beam and updates the beam priority.

In operation S160, the transmitting node 100 and the receiving node 200 transmit and/or receive data. The data transmission and reception may be performed when the combination of the changed Tx/Rx beams is capable of providing the service.

In operation S170, the receiving node 200 determines whether a service is disconnected while the service is provided through the transmission and reception of data. For example, the disconnection of the service may correspond to the case in which an obstacle appears between the transmitting node 100 and the receiving node 200. When it is determined that the service is disconnected, the receiving node 200 transmits, to the transmitting node 100, information indicating a service disconnection in operation S180.

When it is determined that the service is disconnected, the transmitting node 100 initializes a beam change period, and updates a beam priority in operation S190.

Figure 9:
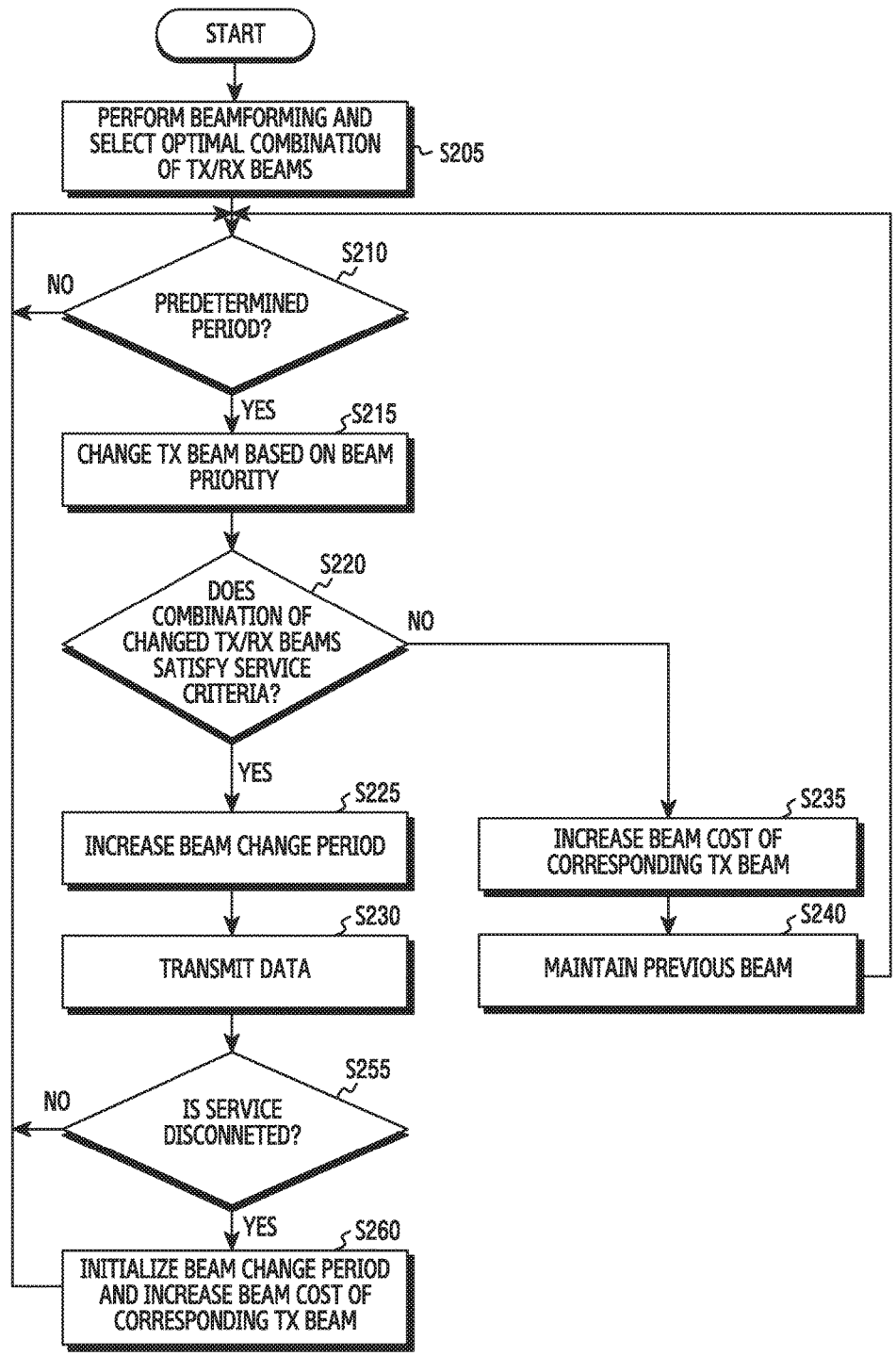
FIG. 9 is a flowchart illustrating a processing flow of beam selection by a transmitting node according to another embodiment of the present invention.

Although FIG. 8 illustrates that beam selection is performed as a one-shot event for the ease of description, the beam selection is performed repeatedly, as illustrated in FIG. 9, and selects a beam that is least frequently disconnected, based on statistical information in a given situation.

FIG. 9 is a flowchart illustrating a processing flow of beam selection by the transmitting node 100 according to another embodiment of the present invention. The flow illustrated in FIG. 9 is merely an example for describing the invention, and various modified flows are available, and thus, it should not be construed that the example limits the scope of the present invention.

Referring to FIG. 9, in operation S205, the transmitting node 100 performs beamforming, and searches for a combination of optimal Tx/Rx beams. Operation S205 corresponds to a first beam training process.

In operation S210, the transmitting node 100 determines whether a predetermined period arrives. When the predetermined period arrives, the transmitting node 100 changes a Tx beam based on a beam priority in operation S215. In response to the change of the Tx beam, the receiving node 200 searches for an optimal Rx beam with respect to the changed Tx beam. Operations S210 and S215 correspond to a second beam training process.

In operation S220, the transmitting node 100 determines whether the combination of the changed Tx/Rx beams satisfies service criteria. According to an embodiment of the present invention, whether the combination of the changed Tx/Rx beams satisfies the service criteria is determined by the receiving node 200. As the result of the determination is transmitted to the transmitting node 100, the transmitting node 100 may determine whether the combination of the changed Tx/Rx beams satisfies the service criteria.

When the combination of the changed Tx/Rx beams satisfies the service criteria, the transmitting node 100 increases the beam change period in operation S225, and transmits data in operation S230.

When the combination of the changed Tx/Rx beams does not satisfy the service criteria, unlike the above description, the transmitting node 100 increases the beam cost associated with the corresponding Tx beam in operation S235, maintains the previous Tx that was used before changing in operation S240, and proceeds with operation S210.

In operation S255, the transmitting node 100 determines whether a service is disconnected while transmitting data. According to an embodiment of the present invention, whether the service is disconnected may be determined by the receiving node 200, and information indicating that the disconnection of the service occurs may be reported to the transmitting node 100.

When it is determined that the service is disconnected, the transmitting node 100 initializes a beam change period in operation S260, and increases the beam cost associated with the corresponding transmission beam, so as to update a beam priority. After performing operation S260, the transmitting node 100 returns to operation S210. When it is determined that the disconnection of the service does not occur in operation S255, unlike the above description, the transmitting node 100 immediately proceeds with operation S210.

The flow illustrated in FIG. 9 corresponds to the flow illustrated in FIG. 6A. Although FIG. 9 illustrates only the processing flow corresponding to the flow illustrated in FIG. 6A, flows corresponding to the flows of FIGS. 6B and 6C may be performed in a similar manner. For example, operations S255 and S260 of FIG. 9 may be performed after operation S230 of FIG. 6B. As another example, operations S255 and S260 of FIG. 9 may be performed after operations S230 and S250 of FIG. 6C.

Figure 10:
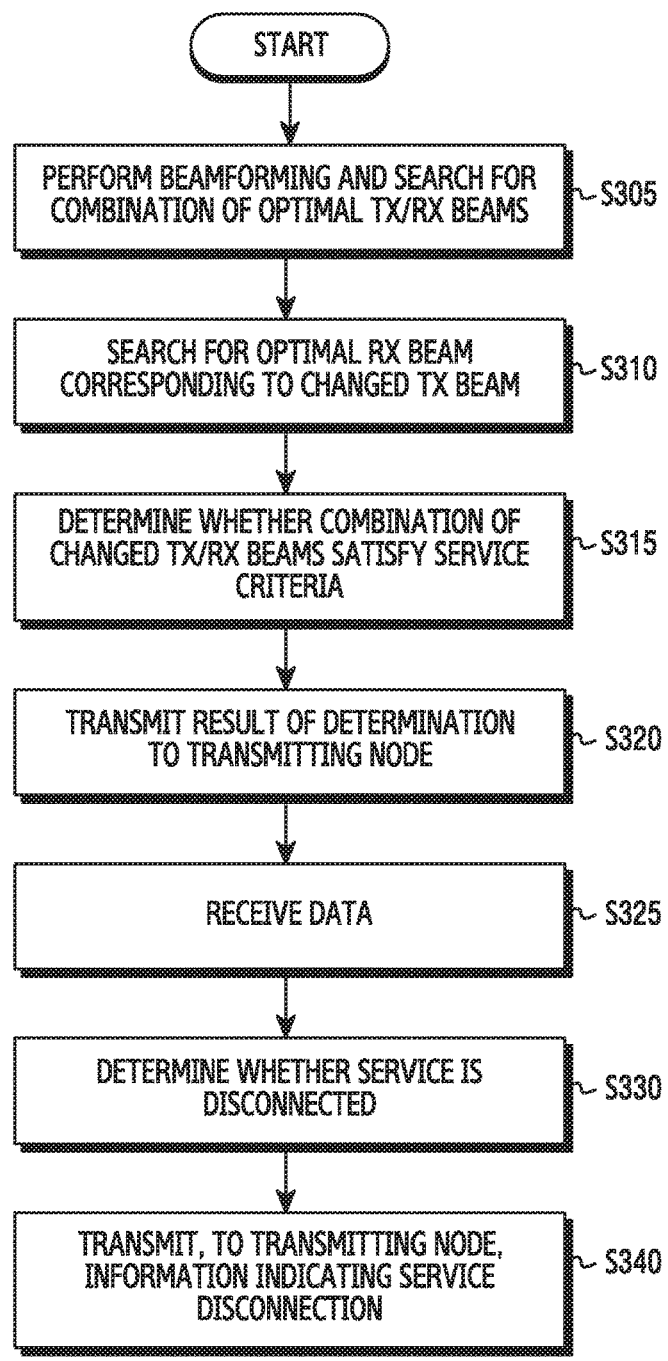
FIG. 10 is a flowchart illustrating a processing flow of beam selection by a receiving node according to another embodiment of the present invention.

FIG. 10 is a flowchart illustrating a processing flow of beam selection by the receiving node 200 according to another embodiment of the present invention. The flow illustrated in FIG. 10 is merely an example for describing the invention, and various modified flows are available, and thus, it should not be construed that the example limits the scope of the present invention.

Referring to FIG. 10, in operation S305, the receiving node 200 performs beamforming, and searches for a combination of optimal Tx/Rx beams. Operation S305 corresponds to a first beam training process.

In operation S310, the receiving node 200 searches for an optimal Rx beam with respect to a Tx beam that is changed by the transmitting node 100. According to an embodiment of the present invention, a Tx beam is changed by the transmitting node 100 based on a predetermined period, and the transmitting node 100 changes a Tx beam based on a beam priority. Operation S310 corresponds to a second beam training process.

The receiving node 200 determines whether a combination of changed Tx/Rx beams satisfies service criteria in operation S315. The receiving node 200 transmits, to the transmitting node 100, the result of the determination on whether the combination of the changed Tx/Rx beams satisfies the service criteria in operation S320.

In operation S325, the receiving node 200 receives data. The reception of data is performed when the transmitting node 100 transmits data in response to when it is determined that the combination of the changed Tx/Rx beams satisfies the service criteria and the result of the determination is transmitted to the transmitting node 100.

In operation S330, the receiving node 200 determines whether a service is disconnected while receiving data. In operation S340, the receiving node 200 reports, to the transmitting node 100, information indicating whether the service is disconnected.

Figure 11:
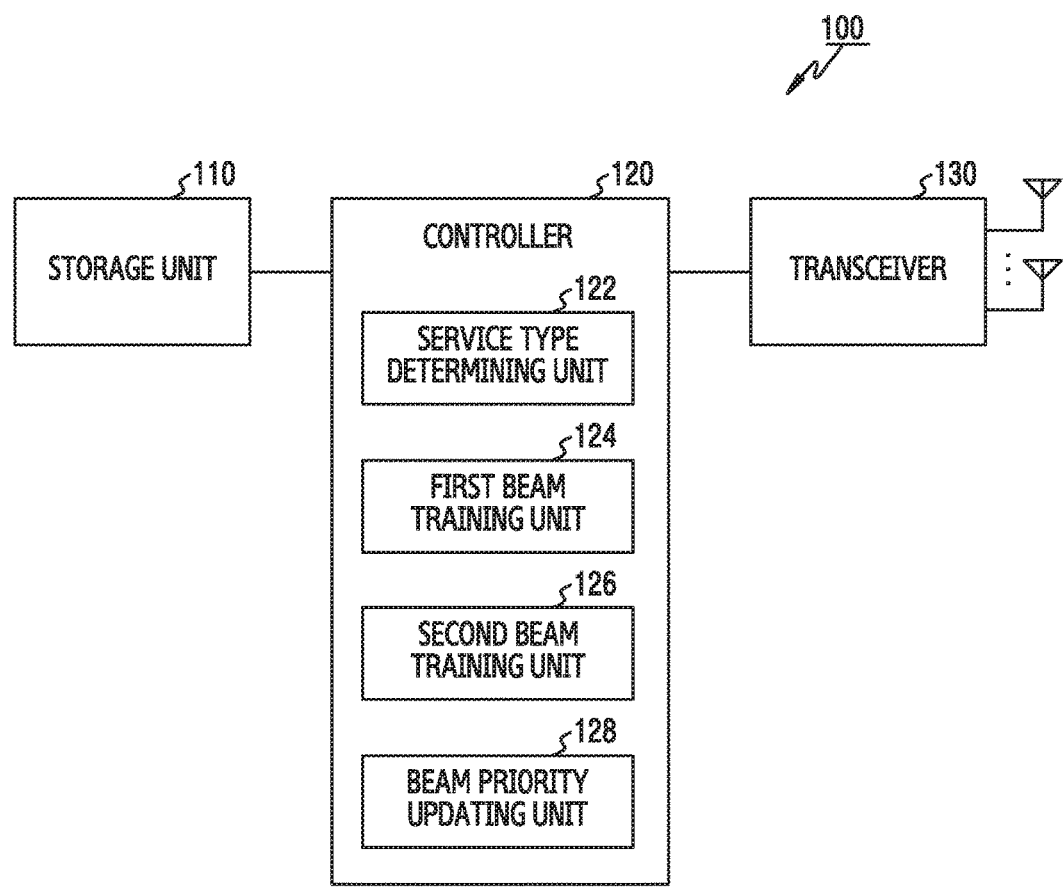
FIG. 11 is a diagram illustrating a configuration of a transmitting node for beam selection according to various embodiments of the present invention.

FIG. 11 is a diagram illustrating a configuration of the transmitting node 100 for beam selection according to various embodiments of the present invention. The configuration illustrated in FIG. 11 is merely an example for describing the invention and various modified configurations are available, and thus, it should not be construed that the example limits the scope of the present invention. Referring to FIG. 11, the transmitting node 100 includes a storage unit 110, a controller 120, a transceiver 130, and antennas. The storage unit 110 stores basic programs for the operations of the transmitting node 100, application programs, and data of various pieces of information. For example, the storage unit 110 may store the programs for the flows illustrated in FIGS. 6A to 6C and the flow illustrated in FIG. 9. Also, the storage unit 110 stores a list of beam priorities according to embodiments of the present invention. The controller 120 determines a type of service, and selects an optimal beam based on the determined type of service. The transceiver 130 transmits data using an optimal beam selected by the controller 120. The transceiver 230 may include a baseband processing unit and a radio frequency processing unit, and may support Tx beamforming and Rx beamforming.

The controller 120 may include a service type determining unit 122, a first beam training unit 124, a second beam training unit 126, and a beam priority updating unit 128.

The service type determining unit 122 may determine whether a service to be provided to the receiving node 200 is a non-real time service or a real time service.

When the service type determining unit 122 determines that service corresponds to a non-real time service, the first beam training unit 124 selects an optimal beam from among a plurality of beams, based on a link performance.

When the service type determining unit 122 determines that the service corresponds to a real time service, the first beam training unit 124 selects any one out of the plurality of beams based on a link performance, and the second beam training unit 126 changes the selected beam based on a beam priority for each predetermined period, and selects the changed beam as an optimal beam when the changed beam satisfies predetermined service criteria.

According to an embodiment of the present invention, the service criteria include at least one of a packet error rate and a signal to noise ratio, which are predetermined in the receiving node 200.

The first beam training unit 124 selects a Tx beam having the maximum link performance out of the multiple Tx beams, receives, through the transceiver 130, information associated with an Rx beam having the maximum link performance in the receiving node 200, and selects a combination of the selected Tx beam and the received Rx beam as an optimal beam. According to an embodiment of the present invention, the link performance may include at least one of a signal to noise ratio and a reception signal strength.

Out of the one or more Tx beams remaining after excluding the Tx beam selected from the multiple Tx beams, the second beam training unit 126 determines a single Tx beam, based on the beam priority for each period, and selects, as an optimal beam, a combination of the determined Tx beam and an optimal Rx beam corresponding to the determined Tx beam, which is retrieved by the receiving node 200.

According to an embodiment of the present invention, the second beam training unit 126 increases the period when the changed beam satisfies the service criteria.

According to an embodiment of the present invention, the second beam training unit 126 maintains the selected beam when the changed beam does not satisfy the service criteria.

According to an embodiment of the present invention, the second beam training unit 126 updates the beam priority when the changed beam does not satisfy the service criteria.

According to an embodiment of the present invention, the beam priority is determined based on a statistical beam cost, which indicates the degree of deterioration of a service with respect to each of the multiple beams.

According to an embodiment of the present invention, in response to the report indicating that the disconnection of the service occurs, which is received from the receiving unit 200, the second beam training unit 126 initializes the period, and updates the beam priority.

Figure 12:
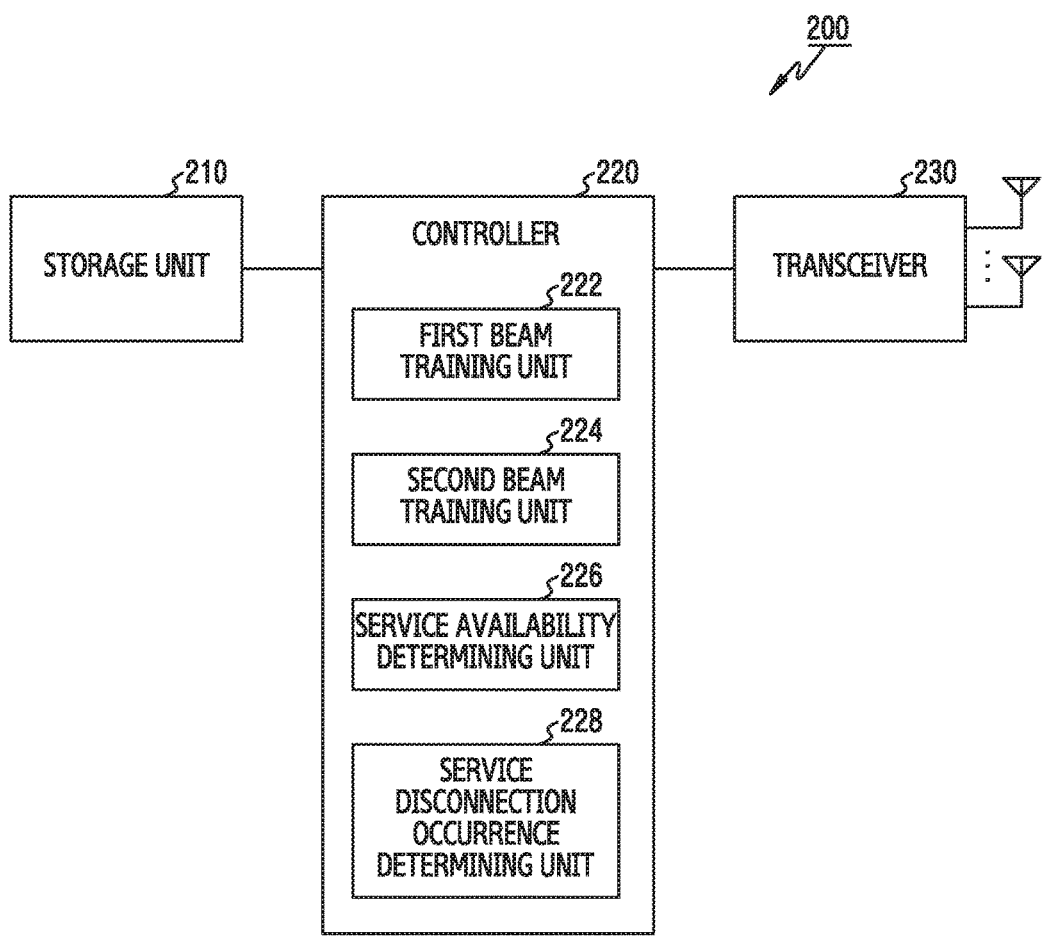
FIG. 12 is a diagram illustrating a configuration of a receiving node for beam selection according to various embodiments of the present invention.

FIG. 12 is a diagram illustrating a configuration of the receiving node 200 for beam selection according to various embodiments of the present invention. The flow illustrated in FIG. 12 is merely an example for describing the invention, and various modified flows are available, and thus, it should not be construed that the example limits the scope of the present invention.

Referring to FIG. 12, the receiving node 200 includes a storage unit 210, a controller 220, a transceiver 230, and antennas. The storage unit 210 stores basic programs for the operations of the receiving node 200, application programs, and data of various pieces of information. For example, the storage unit 210 may store the programs for the flow illustrated in FIG. 7 and the flow illustrated in FIG. 10.

The controller 220 selects an optimal beam based on a type of service of a provided service. The transceiver 230 receives data using the selected optimal beam. The transceiver 230 may include a baseband processing unit and a radio frequency processing unit, and may support Tx beamforming and Rx beamforming.

The controller 220 includes a first beam training unit 222, a second beam training unit 224, a service availability determining unit 226, and a service disconnection occurrence determining unit 228.

When the provided service is a non-real time service, the first beam training unit 222 selects an optimal Rx beam out of the multiple Rx beams based on a link performance.

When the provided service is a real time service, the first beam training unit 222 selects one out of the multiple Rx beams based on a link performance, and the second beam training unit 224 selects an Rx beam corresponding to a Tx beam that is changed by the transmitting node 100 based on a beam priority for each period determined in advance. The service availability determining unit 226 determines whether a combination of the changed Tx beam and the Rx beam corresponding to the changed Tx beam satisfies predetermined service criteria. The transceiver 230 transmits, to the transmitting node 100, the result of the determination, performed by the service availability determining unit 226, on whether the combination of the Tx beam and the Rx beam satisfies the service criteria.

The service disconnection occurrence determining unit 228 determines whether the disconnection of the service occurs while receiving data. The transceiver 230 transmits the result of determining whether the disconnection of the service occurs to the transmitting node 100 so that the transmitting node 100 initializes the period and updates the beam priority.

According to an embodiment of the present invention, the service criteria include at least one of a packet error rate and a signal to noise ratio, which are defined in advance.

According to an embodiment of the present invention, the first beam training unit 222 selects an Rx beam having the maximum link performance from among the multiple Rx beams. According to an embodiment of the present invention, the link performance may include at least one of a signal to noise ratio and a reception signal strength.

According to an embodiment of the present invention, the beam priority is determined based on a statistical beam cost, which indicates a degree of deterioration of a service with respect to each of the multiple beams.

FIG. 13 is a diagram illustrating a list of beam priorities for beam selection according to embodiments of the present invention. The list illustrated in FIG. 13 is merely an example for describing the invention, and various modified lists are available, and thus, it should not be construed that the example limits the scope of the present invention.

Referring to FIG. 13, the beam priority list stores information associated with multiple beams, and also stores information associated with a beam cost and a beam priority of each beam. For example, the beam priority list includes beam costs C1 to C5 and beam priorities P1 to P5, which correspond to 5 beams, #1 to #5, respectively.

Figure 14:
FIG. 14 is a diagram illustrating an example of updating a list of beam priorities for beam selection according to embodiments of the present invention.

FIG. 14 is a diagram illustrating an example of updating a list of beam priorities for beam selection according to embodiments of the present invention. This example considers the situation in which 5 Tx beams exist between the transmitting node 100 and the receiving node 200, as illustrated in FIG. 3B. Here, A indicates that a beam is changed due to an obstacle. X indicates a case in which beam criteria or service criteria are not satisfied. O indicates a case in which beam criteria or service criteria are satisfied. According to a beam priority decision rule (f), â indicates that a beam is changed due to an obstacle. In this instance, a beam priority value may be updated by reflecting −8 to a previous value. b̂ indicates that a beam is changed since the beam criteria or the service criteria are not satisfied. In this instance, a beam priority value may be updated by reflecting −16 to a previous value. ĉ indicates that the beam criteria or the service criteria are satisfied. In this instance, a beam priority value may be updated by reflecting +16 to a previous value. In this instance, it is assumed that the beam criteria or the service criteria correspond to the case in which PER is less than or equal to 10% and a normal state is maintained during a beam change period. A beam priority is set to be different for each service, and an embodiment that updates the beam priority may not be limited to the illustrated example, and may be implemented variously. Therefore, the list illustrated in FIG. 14 is merely an example for describing the invention, and various modified lists are available. Thus, it should not be construed that the example limits the scope of the present invention.

Referring to FIG. 14, the beam costs of all of the beams at a starting point t1 are 0, and priority values of all the beams are 20. In this instance, a first beam that has the maximum link performance may be selected.

When it is determined that an obstacle appears as a person passes through the transmission path of the first beam at t1, beam changing is performed. That is, as illustrated at t2, a beam is changed from the first beam to a second beam. In this instance, the cost value of the first beam is increased by 1. In response to the increase, the priority value p1 of the first beam is updated to 12 by reflecting −8 to 20. The priority values of the other remaining beams are updated in a manner of sharing a value of +8 corresponding to −8. Accordingly, the priority value p2 of the second beam to the priority value p5 of a fifth beam are updated to 22.

When it is determined that an obstacle appears as a person passes through the transmission path of the second beam at t2, beam changing is performed. That is, as illustrated at t3, a beam is changed again from the second beam to the first beam. In this instance, the cost value of the second beam is increased by 1. In response to the increase, the priority value of the second beam is updated to 14 by reflecting −8 to 22. The priority values of the other remaining beams are updated in a manner of sharing a value of +8 corresponding to −8. Accordingly, the priority value p1 of the first beam is updated to 14, and the priority value p3 of a third beam to the priority value p5 of a fifth beam are updated to 24.

At t4, a beam is changed based on the result of performing a second training, which is a short-length training. That is, as illustrated at t4, a beam is changed from the first beam to a fourth beam based on a priority value. When the service provided through the changed fourth beam does not satisfy the service criteria, beam changing is performed again. That is, as illustrated at t5, a beam is changed again to the original beam, which is the first beam, from the fourth beam. In this instance, the cost value of the fourth beam is increased by 1. In response to the increase, the priority value of the second beam is updated to 8 by reflecting −16 to 24. The priority values of the other remaining beams are updated in a manner of sharing a value of +16 corresponding to −16. Accordingly, the priority value p1 of the first beam and the priority value p2 of the second beam are updated to 18. The priority value p3 of the third beam and the priority value p5 of the fifth beam are updated to 28.

At t5, a beam is changed based on the result of performing the second training, which is a short-length training. That is, as illustrated at t6, a beam is changed from the first beam to a fifth beam based on a priority value. When the service provided through the changed fifth beam does not satisfy the service criteria, all of the beams are searched, and the beam is changed to the second beam based on a result of the search. That is, as illustrated at t7, a beam is changed from the fifth beam to the second beam. In this instance, the cost value of the fifth beam is increased by 1. In response to the increase, the priority value of the fifth beam is updated to 12 by reflecting −16 to 28. The priority values of the other remaining beams are updated in a manner of sharing a value of +16 corresponding to −16. Accordingly, the priority value p1 of the first beam and the priority value p2 of the second beam are updated to 22. The priority value p3 of the third beam is updated to 32 and the priority value p4 of the fourth beam is updated to 12.

When it is determined that an obstacle appears as a person passes through the transmission path of the second beam at t7, beam changing is performed. That is, as illustrated at t8, a beam is changed again from the second beam to the third beam. In this instance, the cost value of the second beam is increased by 1. In response to the increase, the priority value of the second beam is updated to 14 by reflecting −8 to 22. The priority values of the other remaining beams are updated in a manner of sharing a value of +8 corresponding to −8. Accordingly, the priority value p1 of the first beam is updated to 24. The priority value p3 of the third beam is updated to 34. The priority value p4 of the fourth beam and the priority value p5 of the fifth beam are updated to 14.

When the service provided through the changed third beam satisfies the service criteria at t8, the beam change period may be increased. In this instance, the priority value of the third beam is updated to 50 by reflecting +16 to 34, as illustrated at t9, and the priority values of the other remaining beams are updated in a manner of sharing −16 corresponding to +16. Accordingly, the priority value p1 of the first beam is updated to 20. The priority value p2 of the second beam, the priority value p4 of the fourth beam, and the priority value p5 of the fifth beam are updated to 10.

At t9, a beam is changed based on the result of performing the second training, which is a short-length training. That is, as illustrated at t9, a beam is changed again from the third beam to the first beam. When the service provided through the changed first beam satisfies the service criteria, the beam change period may be increased. In this instance, the priority value of the first beam is updated to 36 by reflecting +16 to 20, as illustrated at t10, and the priority values of the other remaining beams are updated in a manner of sharing −16 corresponding to +16. Accordingly, the priority value p3 of the third beam is updated to 46. The priority value p2 of the second beam, the priority value p4 of the fourth beam, and the priority value p5 of the fifth beam are updated to 6.

At t10, a beam is changed based on the result of performing the second training, which is a short-length training. That is, as illustrated at t10, a beam is changed from the first beam to the third beam. When the service provided through the changed third beam satisfies the service criteria, the beam change period may be increased. In this instance, the priority value of the third beam is updated to 62 by reflecting +16 to 46, as illustrated at t11, and the priority values of the other remaining beams are updated in a manner of sharing −16 corresponding to +16. Accordingly, the priority value p1 of the first beam is updated to 32. The priority value p2 of the second beam, the priority value p4 of the fourth beam, and the priority value p5 of the fifth beam are updated to 2.

At t11, the third beam is maintained based on a beam priority value.

As described above, according to embodiments of the present invention, in a beam training process, the beam cost of a beam that has a poor link performance gradually increases. Accordingly, the beam will not be selected later. Also, in the case of beams that are disconnected due to an obstacle or a person although having a good link performance, the beam costs of the beams gradually increase, and thus, the beams will not be selected. However, when the environment is changed again and the obstacle disappears, the beam costs are gradually decreased again by a beam window, and thus, may be selected as an optimal path. According to various embodiments of the present invention, when a real-time service is provided, such as streaming, an optimal path in which the streaming is not disconnected may be detected through learning by avoiding a path where an obstacle apprears or a moving path through which many people pass. When learning an optimal path, physical angle information of a beam or location information of a transmitting node and a receiving node are not needed. The present invention may adapt to the environment only through learning. Due to convenience, the present invention is more appropriate for a real situation.

Although the present invention has been described by the restricted embodiments and the drawings as described above, the present invention is not limited to the aforementioned embodiments, and various modifications and alterations can be made from the descriptions by those skilled in the art to which the present invention pertains. As an example, although it is described that embodiments of the present invention operate according to the flow illustrated in FIGS. 4 to 10, a transmitting node and a receiving node are configured as illustrated in FIGS. 11 and 12, and a beam priority list is updated as illustrated in FIGS. 13 and 14, the scope of the present invention may not be limited thereto.

The operations according to an embodiment of the present invention may be implemented by a single controller. In this instance, a program instruction for implementing an operation implemented by various computers may be recorded in a computer readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When some or all of a base station and a relay described in the present invention are implemented by a computer program, a computer readable recording medium that stores the computer program is also included in the present invention. Therefore, the scope of the present invention cannot be determined merely on the basis of the described embodiments. Rather, the scope of the present invention should be determined on the basis of the accompanying claims and their equivalents.

The invention claimed is:

1. A method for operating a device capable of communicating with another device in a wireless communication system, the method comprising:
    determining a type of service;
    determining an optimal beam based on the determined type of service; and
    beamforming by using the optimal beam,
    wherein the optimal beam is determined according to link performance from among a plurality of beams, if the determined type of service corresponds to a first type, and
    wherein the optimal beam is determined according to a number of service disconnection during a predetermined period from among the plurality of beams, if the determined type of service corresponds to a second type.

2. The method of claim 1, wherein the determining of the optimal beam comprises:
    identifying a beam of a plurality of beams based on a link performance, if the determined type of service corresponds to the second type;
    changing the beam based on a beam priority; and
    determining the changed beam as the optimal beam if the changed beam satisfies predetermined service criteria.

3. The method of claim 2, wherein the identifying of the beam of the plurality of beams based on the link performance comprises:
    identifying a transmission beam that provides a maximum link performance among a plurality of transmission beams;
    receiving information associated with a reception beam that provides the maximum link performance from a receiving node; and
    determining a combination of the transmission beam and the reception beam as the optimal beam.

4. The method of claim 2, further comprising:
    increasing a period for changing the beam, if the changed beam satisfies the service criteria;
    maintaining the selected beam, if the changed beam does not satisfy the service criteria; and
    updating the beam priority, if the changed beam does not satisfy the service criteria.

5. The method of claim 2, further comprising:
    receiving, from a receiving node, a report informing that a service is disconnected while data is received; and
    initializing a period for changing the beam and updating the beam priority.

6. The method of claim 2,
    wherein the beam priority is determined based on a beam cost, and
    wherein the beam cost indicates statistical information regarding deterioration of a service while a corresponding beam is used.

7. The method of claim 2, wherein the link performance comprises at least one of a received signal strength or a signal to noise ratio.

8. The method of claim 1, wherein the determining of the optimal beam comprises:
    identifying a reception beam corresponding to a transmission beam that is changed by a transmitting node based on a beam priority, if the determined type of service corresponds to the second type; and
    transmitting, to the transmitting node, an identification whether the combination of the transmission beam and the reception beam satisfies a service criteria.

9. The method of claim 8, further comprising:
    detecting that a service is disconnected while data is received; and
    transmitting a report that the service is disconnected, so as to enable the transmitting node to initialize a period for changing the beam and to update the beam priority.

10. The method of claim 8, wherein the service criteria includes at least one of a packet error rate or a signal to noise ratio.

11. An apparatus for a device capable of communicating with another device in a wireless communication system, the apparatus comprising:
    a controller configured to determine a type of service and an optimal beam based on the determined type of service; and
    a transceiver configured to beamform by using the optimal beam,
    wherein the optimal beam is determined according to link performance from among a plurality of beams, if the determined type of service corresponds to a first type, and
    wherein the optimal beam is determined according to a number of service disconnection during a predetermined period from among the plurality of beams, if the determined type of service corresponds to a second type.

12. The apparatus of claim 11, wherein the controller is further configured to:
    identify a beam of a plurality of beams based on a link performance, if the determined type of service corresponds to the second type;
    change the beam based on a beam priority; and
    determine the changed beam as the optimal beam if the changed beam satisfies predetermined service criteria.

13. The apparatus of claim 12, wherein the controller is further configured to:
    identify a transmission beam that provides a maximum link performance among a plurality of transmission beams;
    control to receive information associated with a reception beam that provides the maximum link performance from a receiving node; and
    determine a combination of the transmission beam and the reception beam as the optimal beam.

14. The apparatus of claim 12, wherein the controller is further configured to:
 increase a period for changing the beam, if the changed beam satisfies the service criteria;
 maintain the selected beam, if the changed beam does not satisfy the service criteria; and
 update the beam priority, if the changed beam does not satisfy the service criteria.

15. The apparatus of claim 12, wherein the controller is further configured to:
 control to receive, from a receiving node, a report informing that a service is disconnected while data is received; and
 initialize a period for changing the beam and update the beam priority.

16. The apparatus of claim 12,
 wherein the beam priority is determined based on a beam cost, and
 wherein the beam cost indicates statistical information regarding deterioration of a service while a corresponding beam is used.

17. The apparatus of claim 12, wherein the link performance comprises at least one of a received signal strength or a signal to noise ratio.

18. The apparatus of claim 11, wherein the controller is further configured to:
 identify a reception beam corresponding to a transmission beam that is changed by a transmitting node based on a beam priority, if the determined type of service corresponds to the second type; and
 control to transmit, to the transmitting node, an identification whether the combination of the transmission beam and the reception beam satisfies a service criteria.

19. The apparatus of claim 18, wherein the controller is further configured to:
 detect that a service is disconnected while data is received; and
 control to transmit a report that the service is disconnected, so as to enable the transmitting node to initialize a period for changing the beam and to update the beam priority.

20. The apparatus of claim 18, wherein the service criteria includes at least one of a packet error rate or a signal to noise ratio.

* * * * *